Aug. 10, 1965    A. R. OGILVIE    3,200,376

BINARY SIGNALLING DEVICE INCLUDING A CODE WHEEL AND END-OF-CODE-SEQUENCE DETECTION

Filed May 16, 1960    3 Sheets-Sheet 1

ALLAN R. OGILVIE
INVENTOR.

BY Fraser and Bogucki

ATTORNEYS

ALLAN R. OGILVIE
INVENTOR.

BY Fraser and Bogucki

ATTORNEYS

Aug. 10, 1965
A. R. OGILVIE
3,200,376
BINARY SIGNALLING DEVICE INCLUDING A CODE WHEEL
AND END-OF-CODE-SEQUENCE DETECTION
Filed May 16, 1960
3 Sheets-Sheet 3

ALLAN R. OGILVIE
INVENTOR.
BY Fraser and Bogucki
ATTORNEYS

United States Patent Office 3,200,376
Patented Aug. 10, 1965

3,200,376

BINARY SIGNALLING DEVICE INCLUDING A CODE WHEEL AND END-OF-CODE-SEQUENCE DETECTION

Allan R. Ogilvie, Hillsborough, Calif., assignor to Secode Corporation, San Francisco, Calif.
Filed May 16, 1960, Ser. No. 29,369
15 Claims. (Cl. 340—164)

This invention relates to pulse code signaling systems and more particularly to a new and improved device for detecting or generating binary coded signals.

In the signaling of a selected one of several receiving stations an identification number may be assigned to each of the receiving stations. By making each receiving station responsive only to a signal coded in accordance with the identification number assigned to the station, a message may be directed to one only of the receiving stations. Such an arrangement is useful not only in communication systems but also in systems for controlling the performance of a number of separate functions where any one of a plurality of control devices is to be individually actuated to perform one or more functions at a proper time and in a proper sequence.

With an increased use of private communication systems having a multiplicity of stations, as well as in systems for controlling multiple functions in a machine or process, a large number of numerical combinations for identifying each of the several stations or functional devices is required. Where a decimally coded pulse train of the type found in conventional telephone systems is employed to transmit the identification number for each one of a large number of receiving stations or functional devices, the time required for the transmission of the identification number becomes so lengthy as to make the system impractical.

Accordingly, it is a primary object of this invention to provide an improved arrangement for the generation and reception of electrical signals bearing coded numerical designations.

Another object of the invention is to provide a new and improved device for use in the generation and identification of electrical signals bearing a binary coded numerical designation.

Yet another object of the invention is to provide a binary signal responsive device of relatively small size for establishing an electrical condition in response to a binary coded signal representing a particular numerical designation.

It is a further object of the invention to provide a binary signal generating device for producing an electrical signal which is binary coded in accordance with a particular numerical designation.

In accordance with one aspect of the invention, a binary signal identification device is provided for establishing an electrical connection in response to a binary coded signal. In one particular embodiment of the invention, a mechanical movement is advanced in response to each binary coded digit of a signal with mechanical decision elements bearing a designated code being brought into position for testing the value of each digit received in sequence. Electrical contacts are included for establishing a selected output condition of the device when it has registered a predetermined number of binary digits bearing a designated code. By means of a slow release electrical relay or mechanical timing device, the mechanical elements are reset whenever a predetermined time interval elapses after the receipt of a binary coded signal.

In accordance with another aspect of the invention, a binary signal generating device is provided for generating a signal train bearing a designated binary coded number. An embodiment of the invention for generating binary coded signals may be constructed to perform signal identification as well, and may include a mechanical movement having the same arrangement for advancing mechanical elements into position as that described above with auxiliary electrical circuitry and switch contacts being provided for performing the binary signal generating function.

A better understanding of the invention may be had from a reading of the following detailed description and by reference to the drawings in which.

Figure 1:
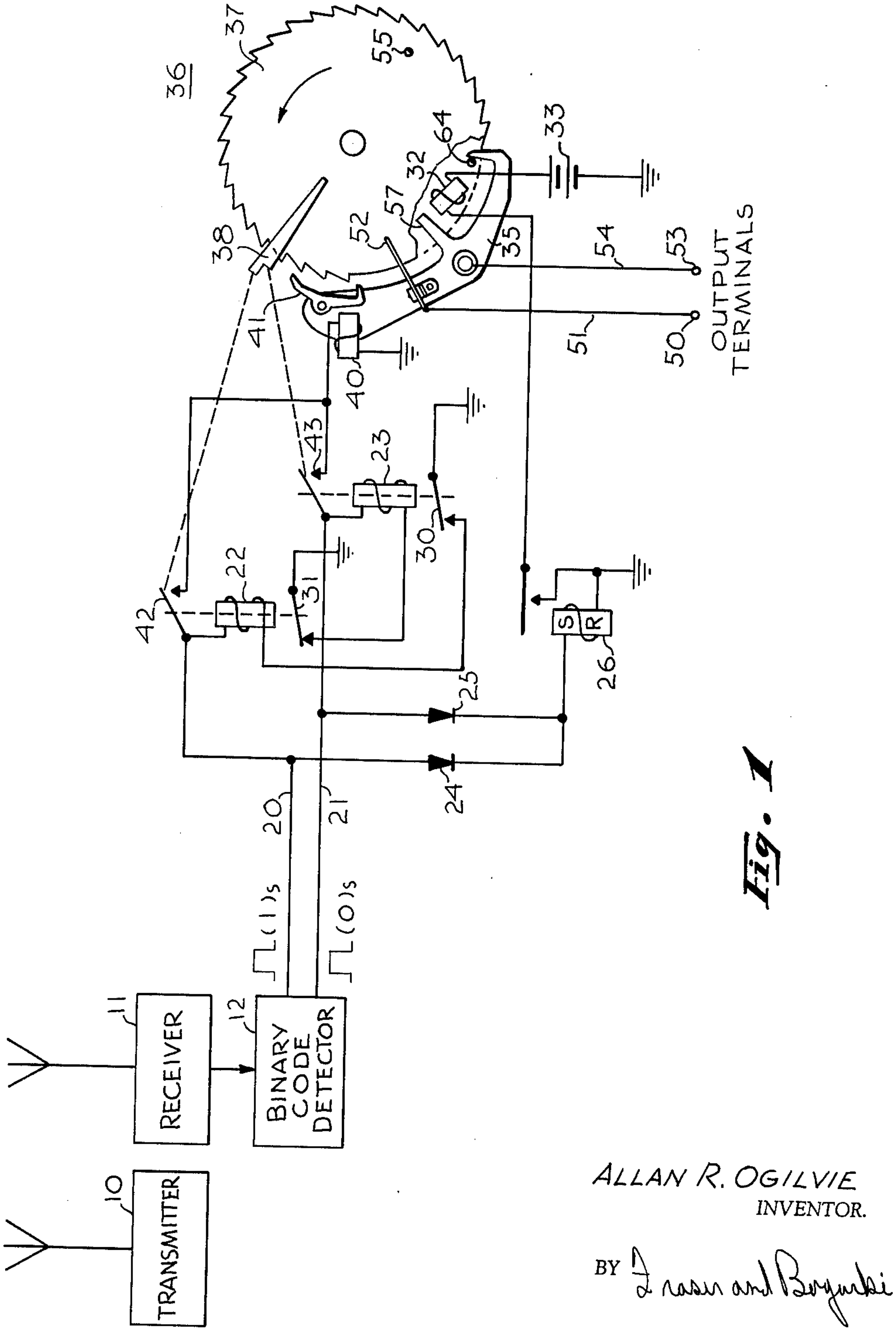
FIG. 1 is a diagrammatic illustration of a signaling system in accordance with the invention.
Figure 2:
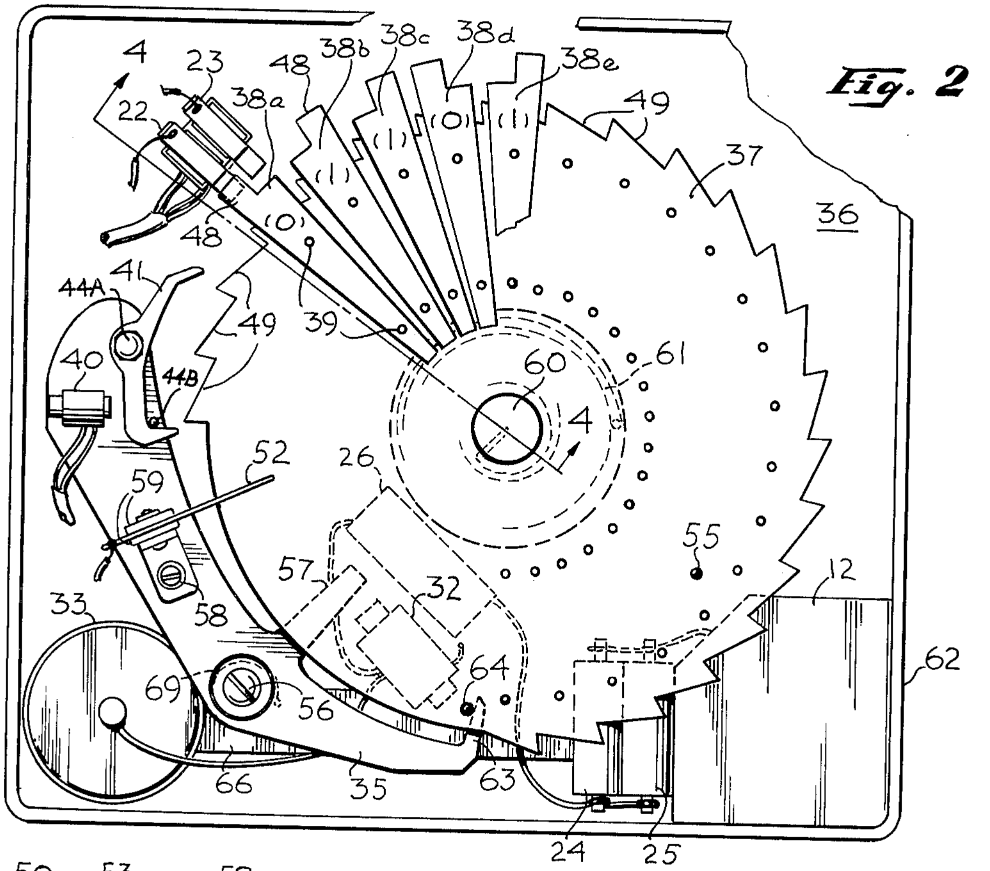
FIG. 2 is a plan view of a binary signaling device in accordance with the invention from which the cover has been removed.
Figure 3:
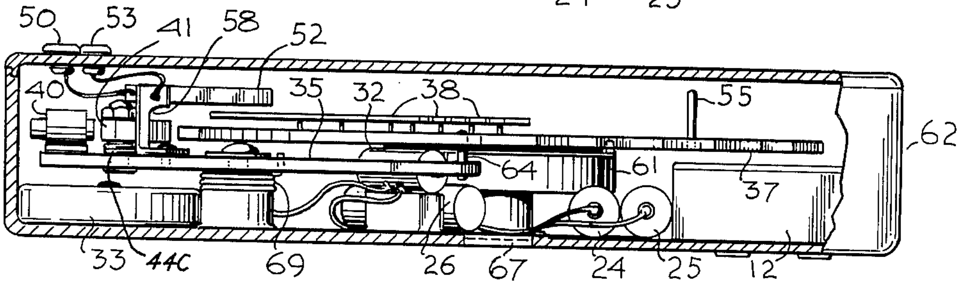
FIG. 3 is a front view of the device of FIG. 2 with the housing being partially broken away.
Figures 5A, 5B, 6:
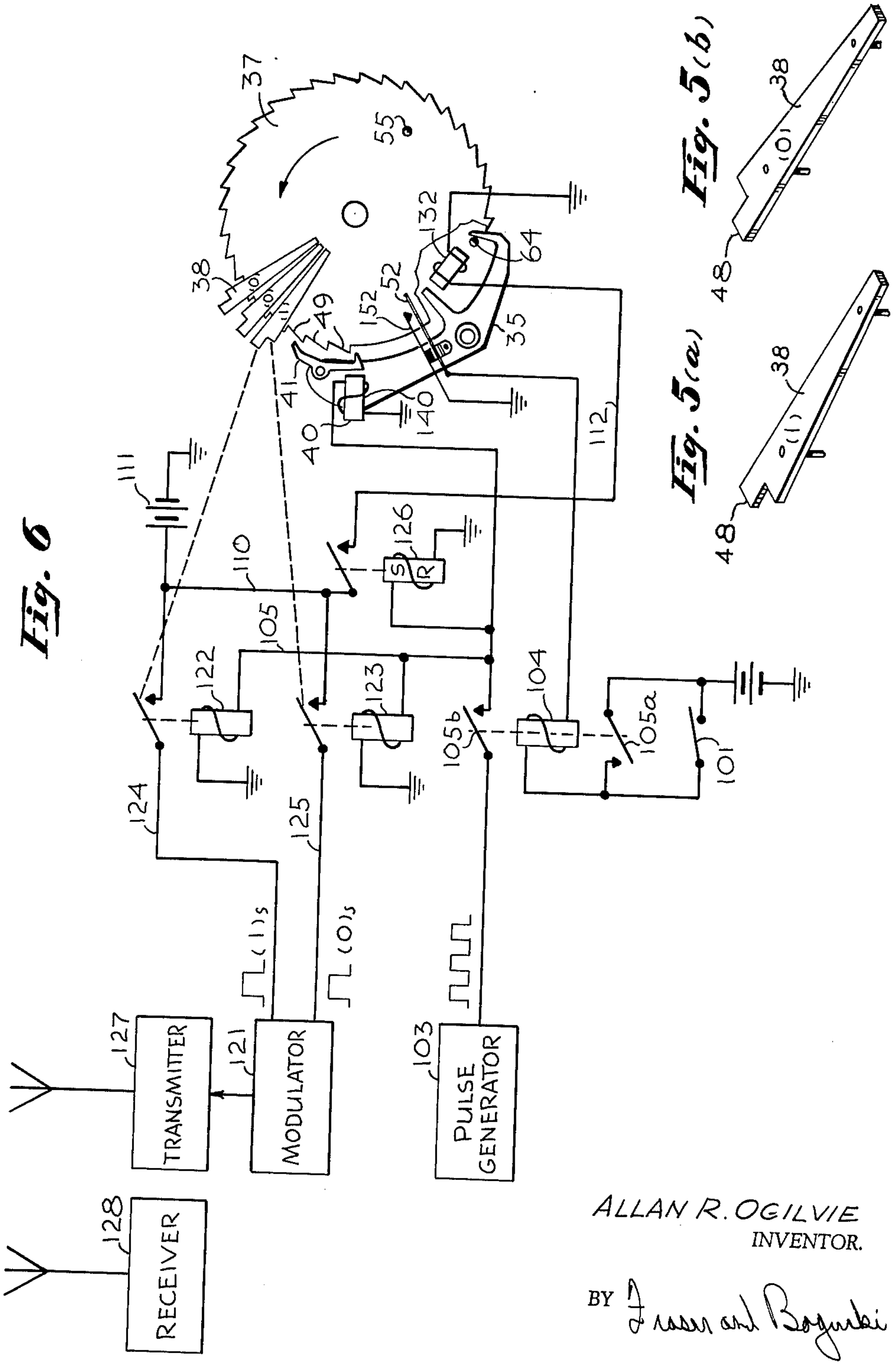

FIGS. 5(*a*) and 5(*b*) are perspective views of two oppositely coded binary decision elements useful in the system of FIG. 1 and device of FIGS. 2 and 3; and FIG. 6 is a diagrammatic illustration of a binary signal generating system in accordance with the invention.

In each of the several views of the drawings, like reference characters have been employed to designate similar parts with FIGS. 2–5 depicting a particular mechanical arrangement for use in the signal receiving system of FIG. 1 and FIG. 6 depicting a signal transmitting arrangement utilizing a mechanical arrangement similar to that shown in FIGS. 2–5.

Referring now to FIG. 1, a communicaiton system is shown which includes a transmitter 10 for generating station identifying information in the form of binary coded signals and message information which may be similarly coded, or in the form of voice transmission as desired. Information is transmitted in the illustrative system by means of radio waves to any of a plurality of receiving stations 11, one of which appears in FIG. 1.

Signals from the receiver 11 in FIG. 1 are applied to a binary code detector 12 which may comprise a suitable demodulator for producing separate output signals on two leads 20 and 21. A pulse appears on the lead 20 whenever a binary "1" signal is detected and a pulse appears on the lead 21 whenever a binary "0" signal is detected so that when a series of binary coded digits are transmitted by the transmitter bearing a particular numerical designation, pulses appear on corresponding ones of the leads 20 and 21.

It will be appreciated that the particular transmission system shown in FIG. 1 is intended to be by way of example only, and that the invention may be used as well in conjunction with any communication medium, as for example a system in which signals are transmitted over wire lines. Nor is the invention limited to pulse signaling systems inasmuch as any binary information bearing signal may be employed, as for example a D.C. bipolar signal.

The binary "1" lead 20 is connected to a winding of a relay 22 and similarly the binary "0" lead 21 is connected to a winding of a relay 23. In addition, the leads 20 and 21 are connected via a pair of isolating diodes 24 and 25 to the winding of a slow release relay 26 (SR). With this arrangement the presence of a pluse on the binary "1" lead 20 causes the operation of the relay 22 and the operation of the slow release relay 26, and the presence of a pulse on the binary "0" lead 21 effects the operation of the relay 23 and the slow release relay 26. Therefore, the slow release relay 26 is energized by each pulse appearing on the leads 20 and 21 regardless of the value of the binary digit detected.

In FIG. 1, the winding of the relay 22 is returned to ground via a pair of normally closed contacts 30 on the relay 23 and, vice versa, the winding of the relay 23 is returned to ground via a pair of normally closed contacts 31 on the relay 22. By this means, the relays 22 and 23 are interlocked so that only one of them can be energized at a given time thereby preventing false signaling arising from spurious signals which may appear on both the leads 20 and 21. In an alternative arrangement, mechanical interlocking means may be used, if desired, to link the relays 22 and 23 in a toggle mechanism so that the operation of one of the relays always restrains the other from operation.

The closure of the contacts of the slow release relay 26 completes a circuit from a source such as a battery 33 to the solenoid 32. The solenoid 32 functions when energized to release a lever 35 in a mechanical movement generally designated 36. In an alternative arrangement, a slow-to-release characteristic may be built into the solenoid 32 so that the slow release relay 26 may be omitted if desired.

A code disc 37 in the mechanical movement is urged to turn in a counter-clockwise direction by means of a suitable arrangement for applying torque, as for example, a spring 61 (FIG. 2) and is allowed to rotate in the direction of the arrow under the control of an escapement 41. The escapement is actuated by a solenoid 40, which is connected serially with the contacts 42 and 43 of both the relay 22 and the relay 23. The output circuit of the device includes a pair of output terminals 50 and 53, one of which is connected by a lead 51 to a leaf spring contactor 52 which is electrically insulated from the mechanical movement 36. The second output terminal 53 is connected through a lead 54 to the mechanical movement 36 itself, as shown in the drawing by a connection to the lever 35.

The major element of the mechanical movement 36 is a code wheel in the form of a disc 37 which is arranged to bring a pin 55 into contact with the leaf spring contactor 52 when the disc 37 has rotated through approximately 270° from its initial position. Under such conditions the output terminals 50 and 53 are connected together within the device and establish a closed circuit which may be connected to an annunciator or other terminal apparatus for accepting a message from the receiver 11 as desired.

Referring now to FIG. 2, one particular binary signaling device is illustrated in which a mechanical movement 36 may be contained within a housing 62, with the disc 37 being mounted for rotation on a shaft 60, under the influence of a spiral spring 61 secured to the shaft 60 and to the disc 37. The disc 37 carries a set of decision elements 38 in the form of radial members which extend beyond the periphery of the disc 37. Each of the decision elements 38 includes a coding finger 48 with the position of the coding finger 48 corresponding to a given binary coded value. As shown in FIG. 2, the element 38*a* represents a binary "0," while the next two succeeding elements 38*b* and 38*c* represent binary "1's", the elements 38*d* represents a binary "0" and the element 38*e* represents a binary "1." Positioned adjacent the decision element 38*a* are the relays 22 and 23 with armatures in position to be operated in the region of the coding fingers 48 of the decision elements 38. In the position shown, the armature of one relay 22 is intercepted by the coding finger 48 of the decision element 38*a* which represents a binary "0," while the armature of the other relay 23 is free to be operated.

Each of the decision elements 38 is removably mounted on the disc 37 by a pair of pins 39 which mate with radially placed holes in the disc 37, one pair of holes being aligned with each of twenty of twenty-three teeth 49 extending around approximately 240° of the periphery of the disc 37. The disc 37 is urged to rotate by the spring 61 but is prevented from turning in rest position by the lever 35 which engages a pin 64 on the disc 37. The lever 35 is mounted on a pivot 56 and carries an escapement member 41 positioned adjacent the disc 37.

The lever 35 includes an armature 57 which functions in conjunction with the solenoid 32 to rotate the lever 35 on the pivot 56, thereby disengaging the pin 64 so as to release the disc 37 for rotation with the escapement lever 41 being brought into contact with the teeth 49 on the disc 37. Thus, by energizing the solenoid 32, control of the rotation of the disc 37 is transferred from the lever 35 to the escapement 41. The escapement 41 is supported on a shaft 44A and is urged against a pin 44B by a spring 44C (FIG. 3).

The escapement 41 is operated by a solenoid 40 to allow the rotation of the disc 37 from position to position. The escapement 41 allows the disc 37 to rotate by one tooth for each impulse of the solenoid 40 associated therewith.

The spring contactor 52 is mounted on an upstanding bracket 58 on the lever 35 so that the contactor 52 rides above the disc 37 and is insulated from the lever 35 and all the mechanical elements of the device by a pair of insulating spacers 59.

The pin 55 on the disc 37 and the contactor 52 may be connected to a pair of terminals 50, 53 as shown in FIG. 1. The pin 55 is positioned near the periphery of the disc 37 so as to engage the contactor 52 after the advance of disc 37 through a predetermined number of positions corresponding to the number of binary coded digits in the numerical designation of the station at which the device of FIG. 2 is located. When the pin 55 engages the spring 52 an electrical connection is established which indicates the detection and sensing of a signal which corresponds to the numerical designation of the decision elements 38. Upon the release of the solenoid 32, the lever 35 is returned to its initial position by a spring 69 and the disc 37 rotates to its rest or reset position with the pin 64 engaging the extension 63 on the lever 35.

The detector 12 shown in FIG. 1 for producing binary coded "0" and "1" pulses from a received signal along with the diodes 24 and 25 may be mounted beneath the disc 37 as shown in FIG. 2. The slow release relay 26 may also be positioned beneath the disc 37, and a power supply for operation of the solenoid 32 may comprise a miniature storage cell 33 mounted in one corner of the housing 62, with one terminal of the cell 33 being connected to a ground strip 66 and the other terminal being connected to the solenoid 32.

The location of each of the parts of the device of FIG. 1 may be better understood by reference to FIG. 3 in which the disc 37 is positioned midway between the top and bottom surfaces of the housing 62 with the lever 35 carrying the escapement 41 being positioned beneath the disc 37. The space above the disc 37 is taken up by the decision elements 38, with the upstanding pin 55 being arranged to come in contact with the contactor 52 when the disc is advanced by the escapement 41. As shown in FIG. 3, the output terminals 50 and 53 may be electrically connected to the contactor 52 and bracket 58 to complete the circuit to the pin 55 via the electrically conductive parts of the mechanical movement. The bottom of the shaft 60 may include a screwdriver slot 67 or other appropriate means such as a winding stem to enable the spring 61 to be wound. The pin 64 which extends below the disc 37 to engage the lever 35 may be best seen in FIG. 3.

Figure 4:
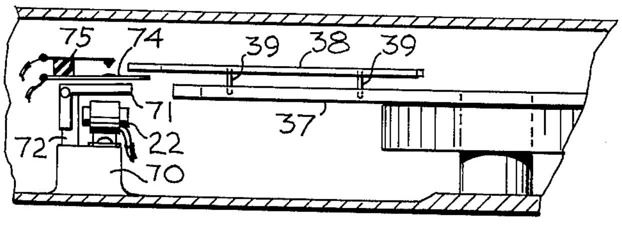
FIG. 4 is a fragmentary sectional view taken along line 4—4 of FIG. 2.

One of the relays 22 and 23 may be seen in the fragmentary sectional view of FIG. 4. The relays 22 and 23 are mounted on a pillar 70 formed integrally with the housing and have an L-shaped armature 71 pivoted about an extension of the pillar 70. The armature is positioned to deflect a spring contact 74 in the upward direction whenever the relay 22 is energized, making contact with a spring contact 75. The spring contact 74 is of sufficient length to underlie the decision element 38 which is adjacent to the relay position. The spring contact 74 is displaceable upwardly to make contact with the spring 75 only when unimpeded by the coding finger 48 of the decision element 38.

Typical examples of the decision elements appear in FIGS. 5(*a*) and 5(*b*). In FIG. 5(*a*), a decision element 38 identified as a binary "1" coded element is shown. The element at its broader end terminates in a step of one-half the width of the outer end so that it in effect has two radial lengths. When associated with the relays 22 and 23 of FIG. 2, the decision element 38 allows the operation of the relay 22 while the extension or finger 48 prevents the closure of the contacts of the relay 23. The decision element 38 of FIG. 5(*b*) represents a binary "0" and is the mirror image of the element of FIG. 5(*a*). The configuration of the decision element 38 of FIG. 5(*b*) allows the operation of relay 23 but the finger 48 prevents the closure of the contacts of the relay 22. Thus, the decision element of FIG. 5(*a*) provides a binary "1" coding which is the opposite of the decision element of FIG. 5(*b*) which provides a binary "0" coding.

In the rest position of the binary signaling device of FIGS. 1–4, the disc 37 is restrained from movement by the lever 35 bearing against the pin 64. Whenever the receiver 11 of FIG. 1 receives a binary coded signal, it is detected by the detector 12 and a pulse appears on either the lead 20 or 21 depending upon the value of the binary coded signal. The received pulse passes through one of the diodes 24 and 25 and operates the slow release relay 26 which in turn operates the solenoid 32, disengaging the lever 35 from the pin 64 and bringing the escapement 41 into contact with the teeth 49 of the disc 37. The received pulse also energizes one of the relays 22 or 23, depending upon the value of the binary coded signal. The contacts 42 or 43 of one of the respective relays 22 or 23 will be operated if the coding of the decision element 38 which is positioned adjacent to the relays 22 and 23 corresponds to the binary value of the received signal. In the particular coding arrangement illustrated in FIG. 2, the decision element is coded as a binary "0" and only the relay 23 may be energized to close its contacts. If a pulse appears on the binary "0" lead 21, the relay 23 is energized and the decision element 38 of FIG. 2 allows the contacts 43 of the relay 23 to close. The closure of these contacts energizes the solenoid 40 controlling the escapement 41, causing it to allow the disc 37 to rotate one position, thereby bringing the second decision element 38*b* into register with the armatures of the relays 22 and 23. If the second pulse of an incoming signal appears on the lead 20 thereby indicating a binary "1," the relay 22 operates and since the decision element 38*b* is coded as a binary "1," the contacts 42 of the relay 22 close and a second energizing pulse reaches the solenoid 40. Thus, the escapement 41 is released to allow the disc 37 to advance one more increment. This process proceeds in sequence if as shown in FIG. 2 the binary signals appear in the sequence 0 1 1 0 1 et seq. until the disc 37 has rotated to bring the pin 55 into contact with the contactor 52, thereby closing the output circuit of the device through the leads 51 and 54 of FIG. 1. After the last binary coded signal is detected and no more signals appear on either output lead of the detector 12, the slow release relay 26 opens and the lever 35 is returned to its rest position with the escapement 41 being disengaged from the teeth of the disc 37 so that the disc 37 turns in a counter-clockwise direction until the pin 64 rests against the lever 35. The device is then in condition to receive the next coded signal.

In the event that a pulse representing an incorrect binary value appears at the output of the detector 12, the contacts of neither the relay 22 or the relay 23 will be closed, since the decision element impedes the closure of the energized relay with the result that the disc 37 will not advance to the next position. Although the next correct pulse will cause the disc to advance, the remaining number of binary coded digits in the coded sequence will be insufficient to advance the disc 37 to the position where the contactor 52 engages the pin 55 to close the output circuit even if the subsequent pulses correspond to the coding of the remaining decision elements, which is unlikely. At the end of the sequence, the slow release relay is deenergized and the lever 35 returns to rest position as before. As the disc 37 turns, the lever 35 is in its rest position so that the contactor 52 is removed from the path of the pin 55 so that no electrical connection is established and the disc 37 rotates to its rest position with the pin 64 engaging the lever 35. In the event that the correct sequence of binary coded signals appears but in insufficient number to match the code of the particular device, the disc 37 will be advanced sequentially to the various positions and will remain at the position corresponding to the last correct signal received and after a delay the slow release relay 26 will release the lever 35, with the contactor 52 being moved out of the path of the pin 55 as the disc 37 turns to rest position.

In the embodiment of FIGS. 1–4, the mechanism is shown as a device for responding to applied binary coded signals. As such, it requires the presentation at the input terminals of the correct code in binary form in the proper sequence to establish an output condition indicative of the presence of the correct code. As shown in the embodiment of the drawings, a single output condition is established by the contact of the pin 55 with the contactor 52. However, in an alternative arrangement in accordance with the invention, a plurality of pins 55 may be provided which are each electrically insulated from the disc 37 and connected to provide multiple outputs. For this purpose, the disc 37 may be divided into two or more sectors, each of which bears a particular coded designation in the form of a group of decision elements. By providing a separate rest position pin 64 and an electrical connection pin 55 for each sector, the device may be employed to respond to two or more transmitted code designations. In order to bring a given sector into the proper position for a comparison with the received code designation, the transmitted signal may be repeated a number of times equal to the number of sectors (thereby insuring that on one transmission the disc 37 will be in proper position) or a false code designation may be transmitted so as to cause the disc 37 to bypass a given sector and reset to the next rest position (thereby bringing the next successive sector into position).

In FIG. 6, there is shown an arrangement in accordance with the invention in which the device of FIGS. 2–5 is adapted to function in a binary signal generating system. In the system of FIG. 6, the mechanical elements shown therein may be identical with those of FIGS. 2–5 and may include a disc 37 carrying pins 64 and 55, a lever 35 carrying the escapement 41 and its solenoid 40, and a pair of normally closed contacts 52 and 152. The circuitry associated with the mechanism is adapted to provide a source of pulses in binary form. The circuitry includes a pulse generator 103 which serves to furnish a continuous train of pulses to actuate the appropriate relays. The pulse generator 103 is connected through the contacts 105*b* of a relay 104 to the windings of two relays 122 and 123 corresponding to the relays 22 and 23 of FIGS. 2 and 3. The pulse generator 103 is also connected through the contacts 105*b* of the relay 104 to the windings of a slow release relay 126 and an escapement solenoid 140. A solenoid 132 receives current from a source 111 via the contacts of the slow releast relay 126 and the normally closed contacts 52 and 152. The contacts of the relays 122 and 123 are connected in parallel to the source 111 and through respective leads 124 and 125 to the input of a modulator 121 which is connected to a transmitter 127 designed to transmit binary coded information to a receiver 128.

In operation as a binary signal generation system, the operator momentarily closes the switch 101 to energize the relay 104 which latches in energized position by virtue of the closing of its lower relay contacts 105*a* and closes a circuit through its upper relay contacts 105*b* to pass pulses from the generator 103. The pulses from the generator 103 energize the relay 126 which in turn allows the flow of current from the source 111 through the leads 110, 112 to energize the solenoid 132, thereby releasing the lever 35 and bringing the escapement 41 into engagement with the teeth 49 of the disc 37. Pulses from the pulse generator 103 also operate the solenoid 140 in sequence, thereby stepping the disc 37 from position to position. Simultaneously with the operation of the solenoid 140, pulses from the generator 103 are applied to the windings of the relays 122 and 123 through the lead 105. Both relays attempt to close their contacts. One only of the relays 122 and 123 will close depending upon the coding of the decision element 38 which is adjacent to the relays 122 and 123 at that moment. For convenience of illustration, only three such decision elements are illustrated in FIG. 6, although it will be appreciated that any desired number may be used. When the contacts of the binary "1" relay 122 close, a voltage is applied to the modulator 121 via the lead 124, and when the contacts of the binary "0" relay close, a voltage is applied to the modulator 121 via a lead 125. The modulator 121 converts the binary coded voltages appearing on the leads 124 and 125 to an appropriate form for transmission by the transmitter 127.

The next succeeding pulse from the generator 103 actuates the escapement 41, allowing the disc 37 to move to the next position and both relays 122 and 123 are again energized, followed by the closure of a selected pair of contacts depending upon the encoding of the decision element 38 then positioned opposite the relays 122 and 123. The process continues step by step until the disc 37 is advanced to the point where the pin 55 opens the contacts 52 and 152, thereby deenergizing the relay 104 so that the contacts 105*b* open. With the contacts 105*b* open, the slow release relay 126 opens, the relay 132 is deenergized and the lever 35 is released which in turn disengages the escapement 41 from the teeth of the disc 37. The disc 37 is then released for rotation to its rest position with the pin 64 against the lever 35. The device is then in condition for the generation of a next sequence of signals upon the closing of the switch 101.

It may therefore be seen that this invention employs as a basic element a mechanism which may serve both to indentify a particular sequence of coded signals, as well as to generate a series of coded signals in sequence. Although any desired number of decision elements may be employed, the diameter of the disc 37 may be of the order of 2 centimeters in a device which carries twenty such elements. Power for the electrical elements of the decoding and encoding device may be furnished by a miniature battery contained within the same housing or from an external source as desired. Despite the small size of the device, by employing binary coding of the decision elements, a high capacity for unique combinations is achieved. For example, where twenty decision elements are employed as herein described, the number of code combinations obtainable is equal to 1,000,000.

The heart of the mechanism is the rotatable drive and its demountable radial coding of memory elements. The decision elements are demountable such that the individual code for the receiver or the transmitter may be introduced into the device merely by the insertion of the appropriate "0" or "1" decision elements in the series of holes extending around the disc 37. Of course, only two types of coding elements are necessary and these may be permanently mounted or integrally formed on the disc if the code combination of the station is intended to be of a permanent nature or the decision elements may be furnished to the operator for insertion or change as need dictates. Additionally, even with a fixed or unchanged arrangement of binary coded elements, flexibility is afforded in the operation of the device by the insertion or removal of additional pins 55 which may be arranged to cooperate with one or more spring contactors 52.

Although there has been described above a particular arrangement of the invention for use in the identification or generation of binary coded signals, it is intended that the description be taken to be by way of example only of the manner in which the invention may be used to advantage. Accordingly, the invention should be considered to include any and all alternatives, modifications or equivalent arrangements falling within the scope of the annexed claims.

What is claimed is:

1. Binary code receiving apparatus comprising a source of binary coded information, a first relay connected to the source and operable by binary "1" signals, a second relay connected to the source and operable by binary "0" signals, a code wheel including discrete sectors positionable with respect to the first and second relays to physically prevent the operation of one of the relays, means responsive to the operation of said relays for sequentially advancing the code wheel to the next discrete sector, means responsive to both the binary "1" and "0" signals for maintaining the advancing means operative during receipt of a continuous sequence of binary coded signals and responsive to the absence of a continuous sequence of binary coded signals from the source for returning the code wheel to an initial position relative to the relays at the end of each continuous sequence and means responsive to the displacement of the code wheel for identifying a particular binary coded signal from said source.

2. The combination in accordance with claim 1 wherein the discrete sectors of the code wheel comprise individual demountable members including an asymmetrical end region extending beyond the periphery of the code wheel, the asymmetry being representative of a binary value.

3. A binary signal device including the combination of a mechanical member having a configuration corresponding to a sequence of binary code values, a sensing station positioned adjacent said mechanical member, said sensing station including electromechanical means for conditionally establishing one of two separate electrical connections depending upon the binary coded value represented by the configuration of the adjacent portion of the mechanical member, means for applying electrical signals to said electromechanical means to cause said electromechanical means to selectively and conditionally establish one of said two separate electrical connections in accordance with the binary coded value represented by the adjacent portion of said mechanical member, means responsive to the establishment of one of two separate electrical connections for transporting said mechanical member with respect to said sensing station to sequentially bring successive portions of the mechanical member adjacent said sensing station, and means responsive to the occurrence of each sequence of applied electrical signals for releasing said mechanical member to be transported sequentially from an initial position by said transporting means and also for returning said mechanical member to said initial position in the absence of a sequence of applied electrical signals.

4. A binary signaling device including the combination of a code wheel having a plurality of individual sectors each representing a selected binary value, a sensing station positioned adjacent the code wheel, said sensing station including electromechanical means for conditionally establishing one of two separate electrical connections, means for applying binary coded electrical signals to energize said electromechanical means to establish one of said two separate electrical connections only when the binary value represented by the sector of said code wheel is adjacent to the relay position. The spring contact 74 is displaceable upwardly to make contact with the spring 75 only when unimpeded by the coding finger 48 of the decision element 38.

Typical examples of the decision elements appear in FIGS. 5(*a*) and 5(*b*). In FIG. 5(*a*), a decision element 38 identified as a binary "1" coded element is shown. The element at its broader end terminates in a step of one-half the width of the outer end so that it in effect has two radial lengths. When associated with the relays 22 and 23 of FIG. 2, the decision element 38 allows the operation of the relay 22 while the extension or finger 48 prevents the closure of the contacts of the relay 23. The decision element 38 of FIG. 5(*b*) represents a binary "0" and is the mirror image of the element of FIG. 5(*a*). The configuration of the decision element 38 of FIG. 5(*b*) allows the operation of relay 23 but the finger 48 prevents the closure of the contacts of the relay 22. Thus, the decision element of FIG. 5(*a*) provides a binary "1" coding which is the opposite of the decision element of FIG. 5(*b*) which provides a binary "0" coding.

In the rest position of the binary signaling device of FIGS. 1–4, the disc 37 is restrained from movement by the lever 35 bearing against the pin 64. Whenever the receiver 11 of FIG. 1 receives a binary coded signal, it is detected by the detector 12 and a pulse appears on either the lead 20 or 21 depending upon the value of the binary coded signal. The received pulse passes through one of the diodes 24 and 25 and operates the slow release relay 26 which in turn operates the solenoid 32, disengaging the lever 35 from the pin 64 and bringing the escapement 41 into contact with the teeth 49 of the disc 37. The received pulse also energizes one of the relays 22 or 23, depending upon the value of the binary coded signal. The contacts 42 or 43 of one of the respective relays 22 or 23 will be operated if the coding of the decision element 38 which is positioned adjacent to the relays 22 and 23 corresponds to the binary value of the received signal. In the particular coding arrangement illustrated in FIG. 2, the decision element is coded as a binary "O" and only the relay 23 may be energized to close its contacts. If a pulse appears on the binary "0" lead 21, the relay 23 is energized and the decision element 38 of FIG. 2 allows the contacts 43 of the relay 23 to close. The closure of these contacts energizes the solenoid 40 controlling the escapement 41, causing it to allow the disc 37 to rotate one position, thereby bringing the second decision element 38*b* into register with the armatures of the relays 22 and 23. If the second pulse of an incoming signal appears on the lead 20 thereby indicating a binary "1," the relay 22 operates and since the decision element 38*b* is coded as a binary "1," the contacts 42 of the relay 22 close and a second energizing pulse reaches the solenoid 40. Thus, the escapement 41 is released to allow the disc 37 to advance one more increment. This process proceeds in sequence if as shown in FIG. 2 the binary signals appear in the sequence 0 1 1 0 1 et seq. until the disc 37 has rotated to bring the pin 55 into contact with the contactor 52, thereby closing the output circuit of the device through the leads 51 and 54 of FIG. 1. After the last binary coded signal is detected and no more signals appear on either output lead of the detector 12, the slow release relay 26 opens and the lever 35 is returned to its rest position with the escapement 41 being disengaged from the teeth of the disc 37 so that the disc 37 turns in a counter-clockwise direction until the pin 64 rests against the lever 35. The device is then in condition to receive the next coded signal.

In the event that a pulse representing an incorrect binary value appears at the output of the detector 12, the contacts of neither the relay 22 or the relay 23 will be closed, since the decision element impedes the closure of the energized relay with the result that the disc 37 will not advance to the next position. Although the next correct pulse will cause the disc to advance, the remaining number of binary coded digits in the coded sequence will be insufficient to advance the disc 37 to the position where the contactor 52 engages the pin 55 to close the output circuit even if the subsequent pulses correspond to the coding of the remaining decision elements, which is unlikely. At the end of the sequence, the slow release relay is deenergized and the lever 35 returns to rest position as before. As the disc 37 turns, the lever 35 is in its rest position so that the contactor 52 is removed from the path of the pin 55 so that no electrical connection is established and the disc 37 rotates to its rest position with the pin 64 engaging the lever 35. In the event that the correct sequence of binary coded signals appears but in insufficient number to match the code of the particular device, the disc 37 will be advanced sequentially to the various positions and will remain at the position corresponding to the last correct signal received and after a delay the slow release relay 26 will release the lever 35, with the contactor 52 being moved out of the path of the pin 55 as the disc 37 turns to rest position.

In the embodiment of FIGS. 1–4, the mechanism is shown as a device for responding to applied binary coded signals. As such, it requires the presentation at the input terminals of the correct code in binary form in the proper sequence to establish an output condition indicative of the presence of the correct code. As shown in the embodiment of the drawings, a single output condition is established by the contact of the pin 55 with the contactor 52. However, in an alternative arrangement in accordance with the invention, a plurality of pins 55 may be provided which are each electrically insulated from the disc 37 and connected to provide multiple outputs. For this purpose, the disc 37 may be divided into two or more sectors, each of which bears a particular coded designation in the form of a group of decision elements. By providing a separate rest position pin 64 and an electrical connection pin 55 for each sector, the device may be employed to respond to two or more transmitted code designations. In order to bring a given sector into the proper position for a comparison with the received code designation, the transmitted signal may be repeated a number of times equal to the number of sectors (thereby insuring that on one transmission the disc 37 will be in proper position) or a false code designation may be transmitted so as to cause the disc 37 to bypass a given sector and reset to the next rest position (thereby bringing the next successive sector into position).

In FIG. 6, there is shown an arrangement in accordance with the invention in which the device of FIGS. 2–5 is adapted to function in a binary signal generating system. In the system of FIG. 6, the mechanical elements shown therein may be identical with those of FIGS. 2–5 and may include a disc 37 carrying pins 64 and 55, a lever 35 carrying the escapement 41 and its solenoid 40, and a pair of normally closed contacts 52 and 152. The circuitry associated with the mechanism is adapted to provide a source of pulses in binary form. The circuitry includes a pulse generator 103 which serves to furnish a continuous train of pulses to actuate the appropriate relays. The pulse generator 103 is connected through the contacts 105*b* of a relay 104 to the windings of two relays 122 and 123 corresponding to the relays 22 and 23 of FIGS. 2 and 3. The pulse generator 103 is also connected through the contacts 105*b* of the relay 104 to the windings of a slow release relay 126 and an escapement solenoid 140. A solenoid 132 receives current from a source 111 via the contacts of the slow releast relay 126 and the normally closed contacts 52 and 152. The contacts of the relays 122 and 123 are connected in parallel to the source 111 and through respective leads 124 and 125 to the input of a modulator 121 which is connected to a transmitter 127 designed to transmit binary coded information to a receiver 128.

In operation as a binary signal generation system, the operator momentarily closes the switch 101 to energize the relay 104 which latches in energized position by virtue of the closing of its lower relay contacts 105*a* and closes a circuit through its upper relay contacts 105*b* to pass pulses from the generator 103. The pulses from the generator 103 energize the relay 126 which in turn allows the flow of current from the source 111 through the leads 110, 112 to energize the solenoid 132, thereby releasing the lever 35 and bringing the escapement 41 into engagement with the teeth 49 of the disc 37. Pulses from the pulse generator 103 also operate the solenoid 140 in sequence, thereby stepping the disc 37 from position to position. Simultaneously with the operation of the solenoid 140, pulses from the generator 103 are applied to the windings of the relays 122 and 123 through the lead 105. Both relays attempt to close their contacts. One only of the relays 122 and 123 will close depending upon the coding of the decision element 38 which is adjacent to the relays 122 and 123 at that moment. For convenience of illustration, only three such decision elements are illustrated in FIG. 6, although it will be appreciated that any desired number may be used. When the contacts of the binary "1" relay 122 close, a voltage is applied to the modulator 121 via the lead 124, and when the contacts of the binary "0" relay close, a voltage is applied to the modulator 121 via a lead 125. The modulator 121 converts the binary coded voltages appearing on the leads 124 and 125 to an appropriate form for transmission by the transmitter 127.

The next succeeding pulse from the generator 103 actuates the escapement 41, allowing the disc 37 to move to the next position and both relays 122 and 123 are again energized, followed by the closure of a selected pair of contacts depending upon the encoding of the decision element 38 then positioned opposite the relays 122 and 123. The process continues step by step until the disc 37 is advanced to the point where the pin 55 opens the contacts 52 and 152, thereby deenergizing the relay 104 so that the contacts 105*b* open. With the contacts 105*b* open, the slow release relay 126 opens, the relay 132 is deenergized and the lever 35 is released which in turn disengages the escapement 41 from the teeth of the disc 37. The disc 37 is then released for rotation to its rest position with the pin 64 against the lever 35. The device is then in condition for the generation of a next sequence of signals upon the closing of the switch 101.

It may therefore be seen that this invention employs as a basic element a mechanism which may serve both to indentify a particular sequence of coded signals, as well as to generate a series of coded signals in sequence. Although any desired number of decision elements may be employed, the diameter of the disc 37 may be of the order of 2 centimeters in a device which carries twenty such elements. Power for the electrical elements of the decoding and encoding device may be furnished by a miniature battery contained within the same housing or from an external source as desired. Despite the small size of the device, by employing binary coding of the decision elements, a high capacity for unique combinations is achieved. For example, where twenty decision elements are employed as herein described, the number of code combinations obtainable is equal to 1,000,000.

The heart of the mechanism is the rotatable drive and its demountable radial coding of memory elements. The decision elements are demountable such that the individual code for the receiver or the transmitter may be introduced into the device merely by the insertion of the appropriate "0" or "1" decision elements in the series of holes extending around the disc 37. Of course, only two types of coding elements are necessary and these may be permanently mounted or integrally formed on the disc if the code combination of the station is intended to be of a permanent nature or the decision elements may be furnished to the operator for insertion or change as need dictates. Additionally, even with a fixed or unchanged arrangement of binary coded elements, flexibility is afforded in the operation of the device by the insertion or removal of additional pins 55 which may be arranged to cooperate with one or more spring contactors 52.

Although there has been described above a particular arrangement of the invention for use in the identification or generation of binary coded signals, it is intended that the description be taken to be by way of example only of the manner in which the invention may be used to advantage. Accordingly, the invention should be considered to include any and all alternatives, modifications or equivalent arrangements falling within the scope of the annexed claims.

What is claimed is:

1. Binary code receiving apparatus comprising a source of binary coded information, a first relay connected to the source and operable by binary "1" signals, a second relay connected to the source and operable by binary "0" signals, a code wheel including discrete sectors positionable with respect to the first and second relays to physically prevent the operation of one of the relays, means responsive to the operation of said relays for sequentially advancing the code wheel to the next discrete sector, means responsive to both the binary "1" and "0" signals for maintaining the advancing means operative during receipt of a continuous sequence of binary coded signals and responsive to the absence of a continuous sequence of binary coded signals from the source for returning the code wheel to an initial position relative to the relays at the end of each continuous sequence and means responsive to the displacement of the code wheel for identifying a particular binary coded signal from said source.

2. The combination in accordance with claim 1 wherein the discrete sectors of the code wheel comprise individual demountable members including an asymmetrical end region extending beyond the periphery of the code wheel, the asymmetry being representative of a binary value.

3. A binary signal device including the combination of a mechanical member having a configuration corresponding to a sequence of binary code values, a sensing station positioned adjacent said mechanical member, said sensing station including electromechanical means for conditionally establishing one of two separate electrical connections depending upon the binary coded value represented by the configuration of the adjacent portion of the mechanical member, means for applying electrical signals to said electromechanical means to cause said electromechanical means to selectively and conditionally establish one of said two separate electrical connections in accordance with the binary coded value represented by the adjacent portion of said mechanical member, means responsive to the establishment of one of two separate electrical connections for transporting said mechanical member with respect to said sensing station to sequentially bring successive portions of the mechanical member adjacent said sensing station, and means responsive to the occurrence of each sequence of applied electrical signals for releasing said mechanical member to be transported sequentially from an initial position by said transporting means and also for returning said mechanical member to said initial position in the absence of a sequence of applied electrical signals.

4. A binary signaling device including the combination of a code wheel having a plurality of individual sectors each representing a selected binary value, a sensing station positioned adjacent the code wheel, said sensing station including electromechanical means for conditionally establishing one of two separate electrical connections, means for applying binary coded electrical signals to energize said electromechanical means to establish one of said two separate electrical connections only when the binary value represented by the sector of said code wheel adjacent the sensing station corresponds to the binary value of the applied electrical signal, and means responsive to the establishment of either of said two separate electrical connections for rotating the code wheel to bring each of said sectors sequentially into position adjacent said sensing station, said rotating means being disabled to permit the code wheel to return to an initial position in the absence of an applied electrical signal during a given interval.

5. A binary signaling device including the combination of a code wheel having a peripheral configuration corresponding to a sequence of binary coded values, a pair of electromechanical sensing means positioned adjacent the code wheel for conditionally establishing one of two separate electrical connections, means for receiving a binary coded electrical signal to selectively energize either one of said electromechanical sensing means in accordance with the binary value of the applied electrical signal, one of said two separate electrical connections being established when the binary coded configuration of the code wheel adjacent the sensing station corresponds to the binary coded value of the electrical signal, and means responsive to the establishment of either of said two separate electrical connections for advancing the code wheel sequentially to the next binary coded value during the time that a sequence of electrical signals is being received, said means for advancing the code wheel including means responsive to the absence of a sequence of applied electrical signals for disabling said advancing means and returning said code wheel to an initial position at the end of each sequence of applied electrical signals.

6. A binary signaling device including the combination of a code wheel having a peripheral configuration corresponding to a sequence of binary coded values, a pair of electromechanical sensing means positioned adjacent the code wheel, means responsive to binary coded electrical signals for energizing said electromechanical sensing means to conditionally establish one of two separate electrical connections, one of said two separate electrical connections being established each time the binary value of the electrical signal corresponds to the adjacent binary coded configuration on the code wheel, means responsive to the establishment of either of said two separate electrical connections for enabling said code wheel to be advanced sequentially to successive ones of the sequence of binary coded values in response to a sequence of electrical signals, and means responsive to the binary code electrical signals for returning said code wheel to its initial position whenever a binary coded electrical signal has not been received during a given time interval, said time interval being less than the interval between adjacent sequences of binary coded electrical signals and more than the time interval between successive binary coded electrical signals within a sequence.

7. An electromechanical device comprising a rotatable code wheel including a sequence of individual decision elements radially carried by the code wheel, each of the decision elements having a configuration corresponding to a selected binary value, means for supplying torque to rotate the code wheel toward successive decision elements in the sequence, a source of electrical pulses, means responsive to a sequence of electrical pulses from the source for releasing the code wheel from an initial position for a sequential advancement from one decision element to the next and for returning the code wheel to the initial position in response to the absence of electrical pulses from the source, means for sensing the configuration of each of the decision elements as the code wheel is advanced sequentially, said sensing means providing an actuating condition in accordance with the binary coded value of the adjacent decision element, means responsive to each actuating condition for permitting the code wheel to be advanced sequentially to the next position by the torque supplying means, and means for establishing an output condition in accordance with the advanced position of the code wheel in response to a sequence of electrical pulses.

8. Binary coding apparatus comprising a multipositioned code wheel including a sequence of code member mounted radially at each position on the code wheel to rotate therewith, the members having respective physical configuration individually representative of selected binary values, a source of electrical pulses having two binary values, a pair of electromechanical means positioned adjacent the code wheel, each of said code members being operative to temporarily disable one of said pair of electromechanical means in accordance with the binary value represented by the code members, means responsive to the binary value of each pulse for selectively energizing one of said pair of electromechanical means, said one of said pair of electromechanical means including switch means for closing an electrical contact when not temporarily disabled by the adjacent code member, means responsive to the closing of the electrical contact for incrementally advancing the code wheel from one position to the next, means for maintaining the code wheel in its advanced position during receipt of a sequence of electrical pulses and for releasing said code wheel to return to its initial position at the end of each sequence of electrical pulses, and means for establishing an output condition in response to the advancement of the code wheel a selected number of positions in response to a closely spaced sequence of electrical pulses.

9. Binary converting apparatus comprising a source of binary coded signals, a code member including a plurality of peripheral binary coded positions arranged in a sequence, means for sensing the value of the binary coding of an adjacent coded position, said sensing means being responsive to the value of the binary coded signals from the source to establish a condition in response to a coincidence of a binary coded signal from the source and the value of the adjacent binary coded position, means coupled to said sensing means for advancing the member sequentially to the next position each time said condition is established during a sequence of binary coded signals from the source, said advancing means including means for releasing the code member to return to an initial position after each sequence of binary coded signals from the source.

10. Apparatus in accordance with claim 9 which further includes means responsive to the advancement of said code member to provide an output indication whenever said code member is advanced to a predetermined position by a sequence of binary coded signals from the source.

11. Binary coding apparatus including the combination of a code wheel divided into a plurality of radial sectors each having a peripheral configuration representing a selected binary value, sensing means positioned adjacent the code wheel for sensing the binary value represented by an adjacent radial sector, a source of binary coded pulses coupled to the sensing means, said sensing means being operative upon a coincidence between the binary coding represented by the adjacent radial sector and a binary coded pulse from the source for advancing the code wheel to a succeeding position during a sequence of binary coded pulses from said source, means responsive to each pulse in a sequence for preventing the code wheel from returning to an initial position during receipt of a sequence of binary coded pulses from said source, and switch means responsive to the advancement of the code wheel to a predetermined position from said initial position by a sequence of binary coded pulses from the source for registering the detection of a particular binary coded train of pulses from said source.

12. Binary coding apparatus including the combination of a code wheel having a configuration corresponding to a sequence of binary coded values, an escapement for controlling the rotation of the code wheel, a source for providing sequences of binary coded signals, means positioned adjacent the code wheel for comparing each binary coded signal from said source with an adjacent binary coded value on said code wheel, means coupled to said comparison means for actuating the escapement to rotate the code wheel sequentially to the next position whenever a binary coded signal from said source is of the same value as the binary value represented by the adjacent configuration of the code wheel, means responsive to each binary coded signal from the source for enabling said escapement only during receipt of a sequence of binary coded signals from the source and for disabling said escapement to permit the code wheel to return to an initial position after each sequence of binary coded signals from the source, and means for establishing an electrical condition in response to the rotation of said code wheel from said initial position to a predetermined position by a sequence of binary coded pulses from the source.

13. Binary code receiving apparatus comprising a source of binary coded sequences of signals, a first relay connected to the source and operable by binary "1" signals, a second relay connected to the source and operable by binary "0" signals, a code wheel including a plurality of discrete sectors representing a particular binary coded sequence and positionable with respect to the first and second relays to physically prevent the operation of a selected one of the relays, means responsive to each operation of either one of said relays for advancing the code wheel from an initial position to successive sectors during each binary coded sequence, means responsive to the absence of binary signals from the source for returning the code wheel to its initial position at the end of each binary sequence, and means responsive to a given displacement of the code wheel from the initial position for identifying the coincidence of the sequence of binary coded signals from said source with said particular binary coded sequence represented by said code wheel.

14. A binary signaling device including the combination of a code wheel having a peripheral configuration corresponding to a sequence of binary coded values, a pair of electromechanical sensing means positioned adjacent the code wheel for conditionally establishing one of two separate electrical connections, means for receiving a binary coded electrical signal to selectively energize either one of said electromechanical sensing means in accordance with the binary value of the applied electrical signal, one of said two separate electrical connections being established when the binary coded configuration of the code wheel adjacent the sensing station corresponds to the binary coded value of the electrical signal, and means responsive to the establishment of either of said two electrical connections for advancing the code wheel sequentially to the next binary coded value during the time that a sequence of electrical signals is being received, said means for advancing the code wheel including means responsive to each sequence of applied electrical signals for disabling said advancing means and returning said code wheel to an initial position at the end of each sequence of applied electrical signals, said code wheel comprising a disk bearing a plurality of individual code members, each of which corresponds to a separate binary coded value and includes a first portion of one selected radial length associated with one of said pair of electromechanical sensing means and a second portion of difference radial length associated with the other of said pair of electromechanical sensing means, the portion having said one selected radial length being adapted to prevent the establishment of the electrical connection by one of said pair of electromechanical sensing means.

15. A binary code transmitter including the combination of a pulse train source, a code wheel comprising a plurality of discrete sectors including a first region having a physical configuration representing one binary value and a second region having a physical configuration representing the opposite binary value, means responsive to the pulses from the source for incrementally rotating the code wheel, relay means connected for operation by pulses from the source, the discrete portions of the code wheel being operative to selectively prevent the operation of one of the relay means dependent upon the binary value, and an output circuit coupled to the relay means for establishing an electrical condition responsive to a selected sequence of binary values represented on the code wheel.

References Cited by the Examiner

UNITED STATES PATENTS

| | | | |
|---|---|---|---|
| 1,924,795 | 8/33 | Lipmann et al. | 340—164 |
| 2,039,966 | 5/36 | Lockhart et al. | 340—164 |
| 2,543,608 | 2/51 | Stemper | 340—164 |
| 2,544,330 | 3/51 | Koenig | 340—164 |
| 2,575,198 | 11/51 | Stickel | 340—164 |
| 2,595,614 | 5/52 | Stickel | 340—164 |
| 2,794,969 | 6/57 | Barnhart | 340—164 |
| 2,947,974 | 8/60 | Stickel | 340—164 |

NEIL C. READ, *Primary Examiner.*

EVERETT R. REYNOLDS, *Examiner.*